United States Patent
Bhamidipaty et al.

(10) Patent No.: US 10,740,445 B2
(45) Date of Patent: Aug. 11, 2020

(54) COGNITIVE BEHAVIORAL SECURITY CONTROLS

(71) Applicant: International Business Machines Corporation, Armonk, NY (US)

(72) Inventors: Anuradha Bhamidipaty, Yorktown Heights, NY (US); Ashish Kundu, Elmsford, NY (US); Debasisha Padhi, Bangalore (IN); Sreekrishnan Venkateswaran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 15/652,944

(22) Filed: Jul. 18, 2017

(65) Prior Publication Data

US 2019/0026448 A1    Jan. 24, 2019

(51) Int. Cl.

| | | |
|---|---|---|
| *G06F 21/31* | (2013.01) | |
| *G06F 21/62* | (2013.01) | |
| *G06N 99/00* | (2019.01) | |
| *G06F 21/36* | (2013.01) | |
| *G06N 20/00* | (2019.01) | |

(52) U.S. Cl.
CPC ............ *G06F 21/316* (2013.01); *G06F 21/36* (2013.01); *G06F 21/6218* (2013.01); *G06N 20/00* (2019.01)

(58) Field of Classification Search
CPC .... G06F 21/316; G06F 21/6218; G06N 20/00
See application file for complete search history.

(56) References Cited

U.S. PATENT DOCUMENTS

| | | |
|---|---|---|
| 6,687,823 B1 | 2/2004 | Al-Salqan et al. |
| 7,300,285 B2 | 11/2007 | Orr et al. |
| 8,024,775 B2 | 9/2011 | Xu et al. |
| 8,086,745 B2 | 12/2011 | Liew et al. |
| 8,301,897 B2 | 10/2012 | Turner |
| 8,347,103 B2 | 1/2013 | Jones et al. |
| 9,081,947 B2 | 7/2015 | Dewan et al. |
| 9,122,850 B2 | 9/2015 | Tse et al. |
| 9,195,822 B2 * | 11/2015 | Carlson ................... G06F 21/45 |
| 9,477,823 B1 * | 10/2016 | Ott ......... G06F 21/316 |
| 10,282,537 B2 * | 5/2019 | Swart ...................... G06F 21/40 |
| 2006/0156385 A1 * | 7/2006 | Chiviendacz ........... G06F 21/36 726/2 |
| 2007/0005967 A1 * | 1/2007 | Mister ..................... G06F 21/36 713/168 |

(Continued)

FOREIGN PATENT DOCUMENTS

| | | |
|---|---|---|
| CA | 2451647 A1 | 1/2005 |
| WO | 2009020482 A2 | 2/2009 |

*Primary Examiner* — Mohammad A Siddiqi
(74) *Attorney, Agent, or Firm* — Kelli D. Morin

(57) ABSTRACT

A system, method and program product for providing cognitive behavior security control (CBSC). A system is disclosed that includes: a repository having a plurality of challenges each including an interactive graphical task; a user interface for graphically presenting challenges to users; an enrollment system for assigning challenges to users and determining an authentic response for each user; an authentication system that collects an observed response from a user presented with an assigned challenge and determines a security control result based on a closeness of the observed response with the authentic response of the user.

14 Claims, 4 Drawing Sheets

(56) References Cited

U.S. PATENT DOCUMENTS

| | | | |
|---|---|---|---|
| 2009/0217045 A1* | 8/2009 | Skoric | H04L 9/3234 713/172 |
| 2011/0166916 A1* | 7/2011 | Inbar | G06F 3/0481 705/14.4 |
| 2013/0007875 A1* | 1/2013 | Jakobsson | G06F 9/454 726/19 |
| 2013/0315477 A1* | 11/2013 | Murray | G06F 16/58 382/159 |
| 2014/0067474 A1* | 3/2014 | Deo | G06Q 30/0203 705/7.32 |
| 2015/0262496 A1* | 9/2015 | Cook | G09B 5/06 434/309 |
| 2018/0198616 A1* | 7/2018 | Feather | H04L 9/321 |

* cited by examiner

COGNITIVE BEHAVIORAL SECURITY CONTROLS

TECHNICAL FIELD

The subject matter of this invention relates to on-line security controls, and more particularly to a system, method and program product for providing on-line security using skill based graphical controls.

BACKGROUND

Effective security controls that are put in place to control access to secure resources (e.g., servers, email accounts, bank accounts, applications, data, etc.) remain a critical challenge as the threat of hackers and like become more and more commonplace. Current security controls rely heavily on password based mechanisms. Examples include: (a) preventive controls that use password authentication to block out unauthorized people; (b) detective controls that detect incorrect passwords and, e.g., send out warnings and/or disable access if entered incorrectly multiple times; and (c) corrective controls that use additional alternative accounts (with passwords) to store/retrieve information for recovery.

Unfortunately, password based systems are vulnerable to various types of breaches, including brute force attacks, fishing attacks, spoofing, social engineering, etc. In addition, a user may write down and/or share their passwords, or use the same password for many accounts, which exposes potential breaches. Because of these inherent vulnerabilities, the ability to compromise password based security controls of others remains relatively high.

Password storage applications are useful in managing and generating unique passwords for users, but suffer from the same inherent vulnerabilities since they require a master password that can be compromised. Biometric controls, such as fingerprint and retina scanner, while effective, require additional hardware and hence may not be adoptable in all environments. Other techniques include pattern based authentication where a user touches or draws patterns on a screen. However, similar to character based passwords, patterns can be copied by and/or shared with others.

SUMMARY

Aspects of the disclosure provide a cognitive behavioral security control (CBSC) platform that utilizes skill based graphical controls to gain access to secure resources. In this approach, a user is challenged with a graphical skill based task that can only be completed with a behavioral match acquired during a training process. A task can be as simple as balancing a ball on a thread using keystrokes, where only a trained user knows the behavior of the ball under a predefined set of parameters, e.g., how sensitive the ball will be moved for each key press, etc. As the parameters of the tasks are changeable for each user, the permutations and combinations of a given task offer more possibilities than those offered by any alphanumeric system. Furthermore, different types of tasks may be deployed on a system to improve security.

A first aspect discloses a cognitive behavior security control (CBSC) system, including: a repository having a plurality of challenges, wherein each challenge includes an interactive graphical task; a user interface for graphically presenting challenges to users; an enrollment system for assigning challenges to users and determining an authentic response for each user; an authentication system that collects an observed response from a user presented with an assigned challenge and determines a security control result based on a closeness of the observed response with the authentic response of the user.

A second aspect discloses a computer program product stored on a computer readable storage medium, which when executed by a computing system, provides cognitive behavior security control, the program product including: program code for storing a plurality of challenges, wherein each challenge includes an interactive graphical task; program code for graphically presenting challenges to users; program code for implementing an enrollment process that assigns challenges to users and determines an authentic response for each user; program code that collects an observed response from a user presented with an assigned challenge and determines a security control result based on a closeness of the observed response with the authentic response for the user.

A third aspect discloses a computerized method of providing cognitive behavior security control, the method comprising: storing a plurality of challenges, wherein each challenge includes an interactive graphical task; providing an interface for graphically presenting challenges to users; enrolling a user, including assigning a challenge to the user and determining an authentic response of the user; presenting an assigned challenge to the user; collecting an observed response from the user; and determining a security control result based on a closeness of the observed response with the authentic response for the user.

BRIEF DESCRIPTION OF THE DRAWINGS

These and other features of this invention will be more readily understood from the following detailed description of the various aspects of the invention taken in conjunction with the accompanying drawings in which.

Figure 1:
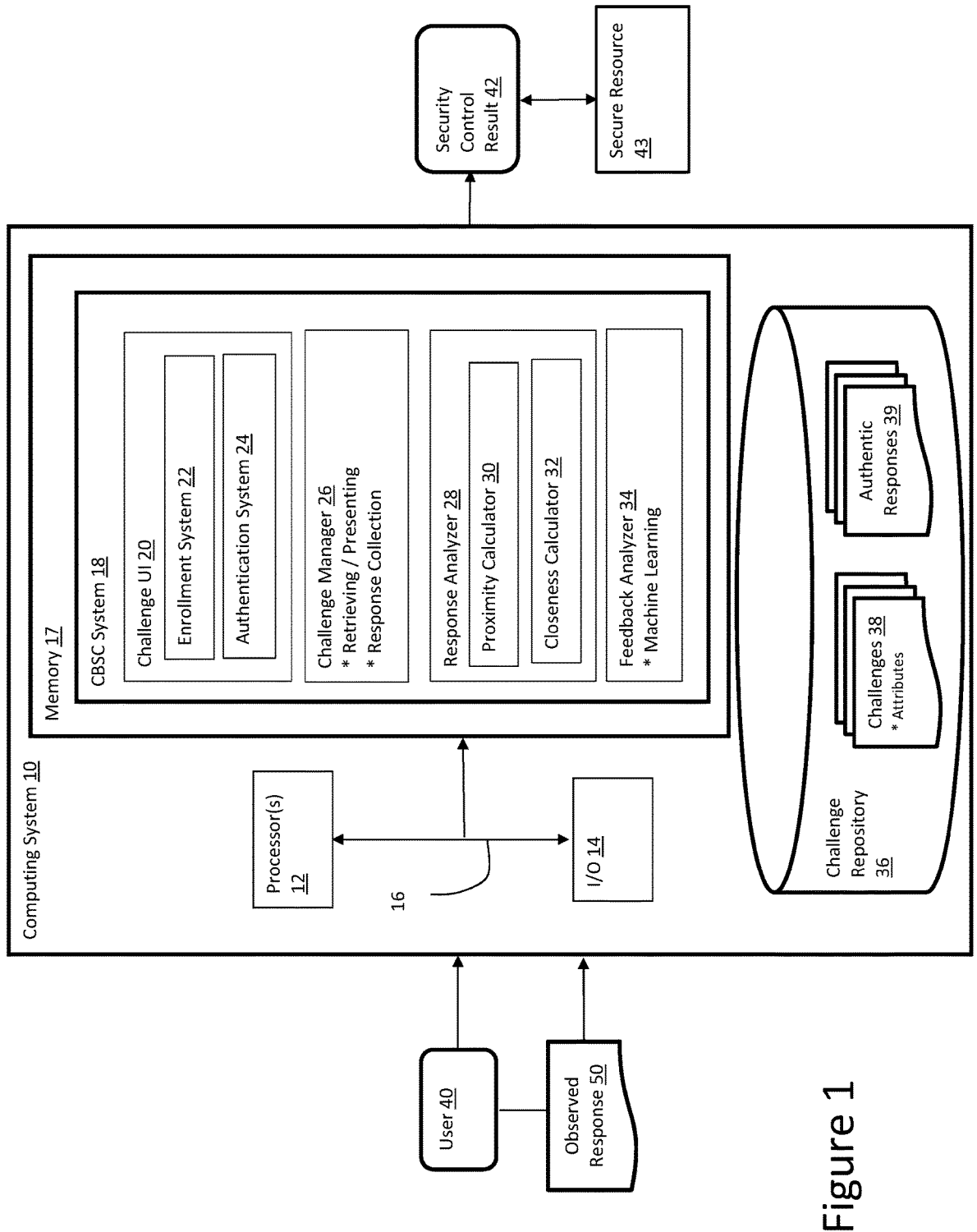
FIG. 1 shows a computing system having a CBSC system according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring now to the drawings, FIG. 1 depicts a computing system 10 having a cognitive behavior security control (CBSC) system 18 that provides an authentication platform, which can be utilized to access a secure resource 43. In the illustrative embodiment of FIG. 1, CBSC system 18 generates a security control result 42 (e.g., pass, fail, repeat, lock-out, etc.) for a user 40 attempting to gain access to secure resource 43. To authenticate user 40, the user 40 is presented with a graphical skill based task (i.e., challenge). The behavioral response of the user in completing the task is compared to a stored response of the user in order to authenticate the user. Thus, the challenge can only be completed by a user whose responsive behavior matches a behavior of the legitimate user recorded during an enrollment/training process.

Figure 4:
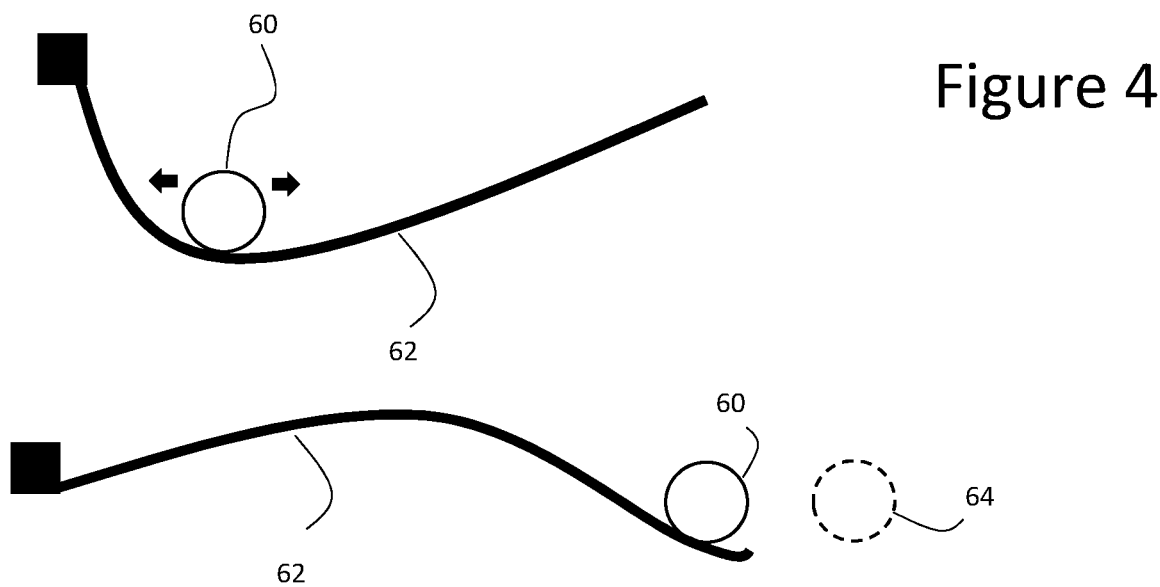
FIG. 4 shows an illustrative challenge according to embodiments.
Figure 5:
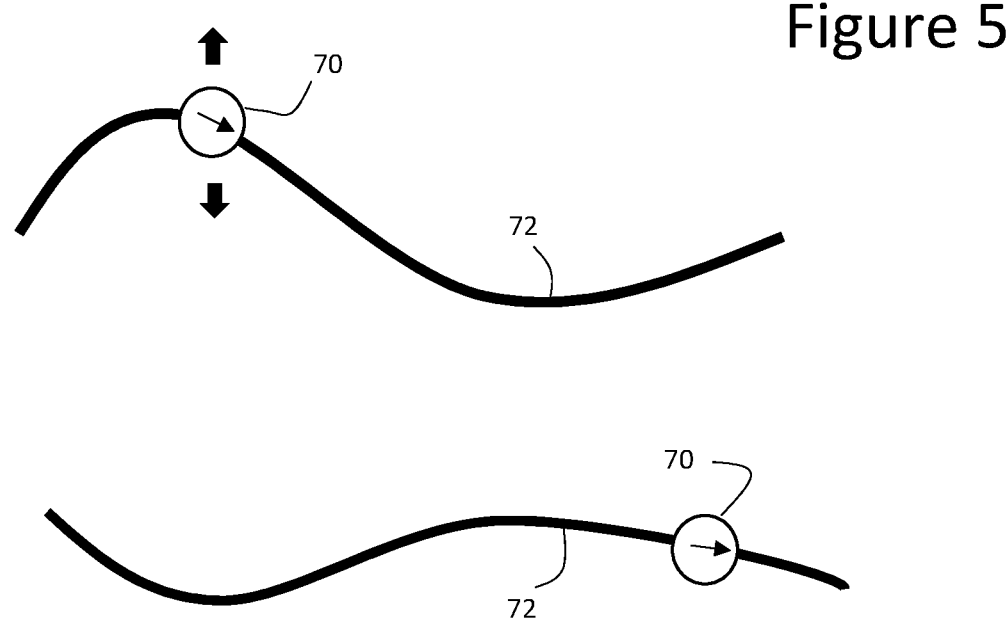
FIG. 5 shows an illustrative challenge according to embodiments.

FIGS. 4 and 5 depict illustrative challenges. In FIG. 4, the user is tasked with graphically moving a ball left and right on top of a rope 62 until the ball 60 falls off the right end of the rope 62. To complete the challenge the user must alternatively press a left key and a right key on a keyboard, moving the ball 60 back and forth until enough velocity is achieved to propel the ball 60 off the right end of the rope (as shown by ball 64). In one illustrative embodiment, holding the left or right key down longer may increase the force applied to the ball—but holding a key down too long may have the opposite effect. The response attributes collected for a user, e.g., number of keystrokes used, time for completing the challenge, etc., will depend on an individual user's skill and behavior.

In FIG. 5, the user is tasked with moving a ball 70 left to right across a dynamically moving rope 70. In this case, the user can use up/down keys to control the path of the ball 70 and the space bar to control velocity. In a similar manner, the response attributes (order of keys pressed, time to complete, etc.) will vary from user to user.

While FIGS. 4 and 5 depict two illustrative challenges, it is understood that the number and type of challenges are not limited to any particular form, input system, etc. As long as a reasonably unique set of response attributes can be obtained for different users presented with the same challenge, any challenge format may be used.

Returning again to FIG. 1, CBSC system 18 generally includes a challenge user interface (UI) 20 that includes an enrollment system 22 through which a new user is trained to complete a graphical skill based task (i.e., challenge) and an authentication system 24 that later presents the same challenge to the user 40 for authentication purposes. From the enrollment system 22 and authentication system 24, other described features of the CBSC system 18 are implemented.

A challenge repository 36 is provided that includes a set of different challenges 38, and each challenge 38 may include a set of control parameters. The control parameters may be used to slightly alter the challenge for different users (e.g., different sensitivities, different keys, etc.). Accordingly, when a user 40 enrolls, a challenge 38 is selected for the user 40, as well as a set of control parameters that make the challenge 38 unique. For example, if the selected challenge 38 requires the user 40 to balance a ball on a rope using certain keyboard letters, the control parameters may dictate which keys on a keyboard are used, the sensitivity of the keystrokes, the response characteristics, etc. Thus, different users can be presented with the same challenge 38, but require a different response to complete the challenge 38.

CBSC system 18 also includes a challenge manager 26 that is called when an enrollment or authentication process is initiated. Challenge manager 26 is responsible for retrieving challenges 38 from the challenge repository 36, presenting the challenges 38 to users, and collecting responses. In the case of a new user enrollment, the selection of a challenge 38 may be done in any manner, e.g., randomly, based on user demographics, etc. During enrollment, the user 40 may be given several training runs to hone their response in completing the challenge. Once a relatively steady state or average is obtained (i.e., no significant performance improvement or behavior changes are detected between training runs), a baseline behavior vector that characterizes the personal response attributes of the user is collected, which is referred to herein as the authentic response 39. The behavior vector that makes up the authentic response 39 is defined by a set of behavior attributes of the user 40 in responding to a challenge 38. Attributes that make up the behavior vector may include any type of action, strategy or performance criteria, such as order of sub-tasks employed by the user, speed to complete the challenge, the average velocity employed by the user to move an object such as a wheel or ball, the acceleration employed by the user to move an object such as a wheel or ball, the sensitivity of the touch employed by the user to move an object such as a wheel or ball, etc. Accordingly, during training, a baseline behavior vector (i.e., authentic response 39) for each user for the user's assigned challenge is obtained and saved. Over time, the authentic response 39 of a user may be refined based on ongoing observed responses 50 collected when the user is authenticated.

During authentication, after the user has been successfully enrolled, the challenge manager 26 retrieves the challenge 38 assigned to the user during enrollment, presents the challenge 38, and collects an observed response 50. The observed response 50 likewise includes the set of behavior attributes, which can be compared to the user's authentic response 39.

The comparison process is implemented by a response analyzer 28, and based on a computation performed by closeness calculator 32, a security control result 42 is generated. In particular, closeness calculator 32 calculates how close the observed response 50 of the user is to authentic response 39 of the user. The closeness is then compared to a threshold value $\beta$ to determine if the user should be authenticated.

$\beta$ may be selected in any manner. In one approach, $\beta$ may be calculated based on the closeness of the user's observed response 50 with the standard behavior of all users responding to the challenge over time. In another approach, an initial value $\beta$ can be manually selected, which can then be cognitively fine-tuned over time. If $\beta$ is selected as too low, there exists a potential for false negatives, i.e., there is a high probability that a genuine user will be identified as an imposter. If $\beta$ is selected as too high, there is a potential for false positives, i.e., there is a high probability that an imposter will be identified as a genuine user. Obviously, the tolerance to false negatives is several orders of magnitude higher than the tolerance to false positives, so $\beta$ can be determined accordingly.

Response analyzer 28 may also be utilized to fine tune the enrollment process. In the case of a new user enrollment, a proximity calculator 30 may be utilized to ensure that the authentic response of a user falls within statistical norms. In one embodiment, the proximity calculator 30 calculates a distance $\alpha$ between the collected user response and other users' responses for the same challenge. If the distance $\alpha$ falls outside a predetermined threshold $\alpha_T$, the challenge 38 is unsuitable for the user and a new challenge is presented as part of the enrollment process. The threshold $\alpha_T$ may for example be the standard deviation of all users' behavior vector from a mean behavior vector (i.e., center of the population). Requiring that the distance $\alpha$ falls within statistical norms ensures that the standard behavior of the entire population is not decreased.

Both the proximity calculator 30 and closeness calculator 32 may utilize any approach for computing a distance or closeness between and among behavior vectors. For example, the distance $\alpha$ may be calculated using a Euclidean process in which a proposed behavior vector (e.g., $x_k, y_k, z_k$) of a new enrollee is compared against an existing mean behavior vector of a larger population. Other techniques for example include order and ranking, paired T-tests, etc.

CBSC system 18 may also include a feedback analyzer 34 that refines the authentication process over time. For example, feedback analyzer 34 may analyze observed responses 50 of a user 40 during authentication processes to refine the authentic response 39. In other words, as the user 40 becomes more and more adept at responding to a challenge 38, the behavior vector that makes up the user's authentic response 39 can be updated. For example, a user may over time require fewer and fewer keystrokes to complete their assigned challenge 38 due to repetition. Such improved attribute (e.g., number of key strokes, time to complete, etc.) can thus be updated within the authentic response 39 for the user 40.

Feedback analyzer 34 may also be utilized to refine the closeness threshold β over time. In particular, machine learning techniques may be employed to ensure that fewer and fewer false positives and false negative results occur. For instance, if genuine users are having trouble being authenticated, the closeness threshold β can be adjusted.

Figure 2:
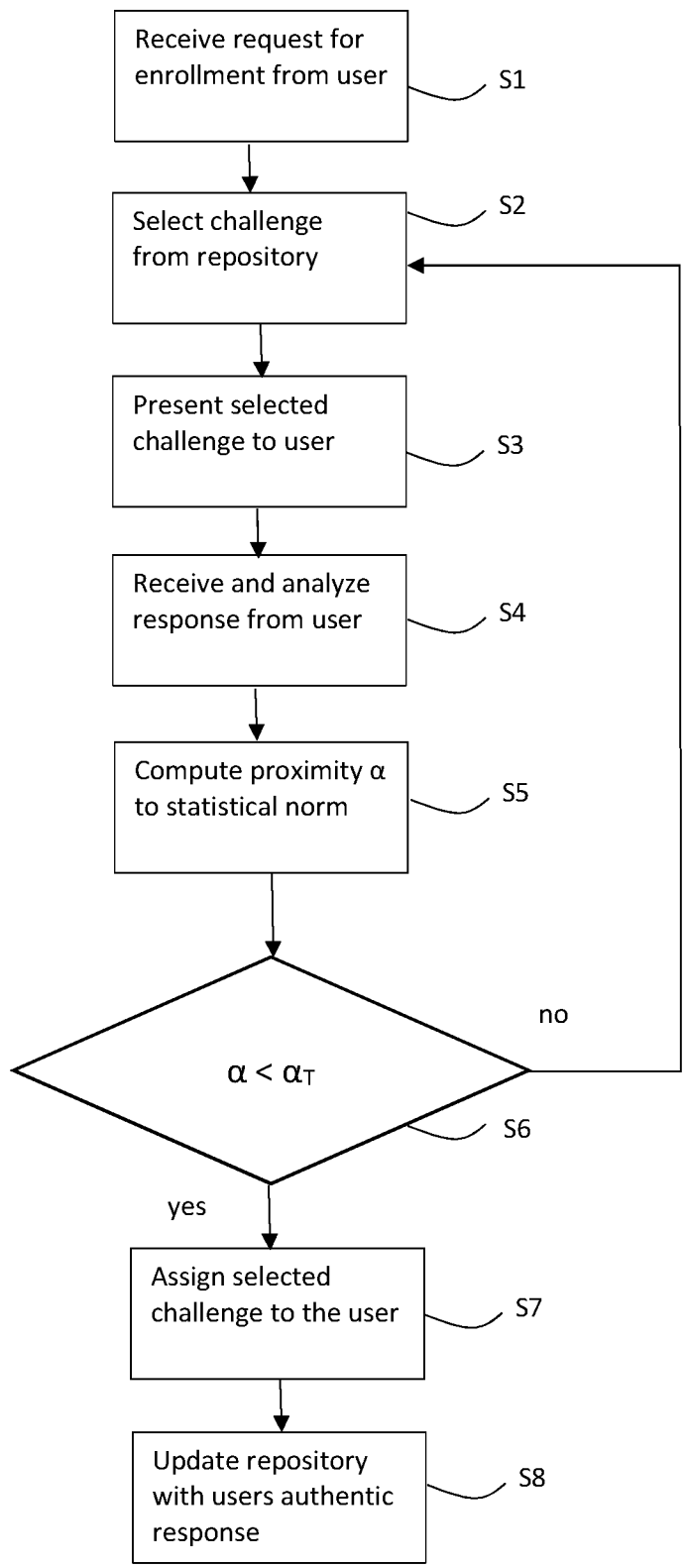
FIG. 2 shows a flow diagram of an enrollment process according to embodiments.

FIG. 2 depicts a flow diagram showing an enrollment process with reference to FIG. 1. At S1, a request for enrollment is received from a new user 40 and at S2 a challenge 38 is selected for the user 40 from the challenge repository 36. At S3, the challenge 30 is presented to the user 40 and at S4 a response is received and analyzed. At S5, a proximity α to a statistical norm is computed by proximity calculator 30 and at S6 a determination is made whether the proximity α is less than a threshold proximity $α_T$. If no, the process returns to S2 where a new challenge is selected for the user. If yes, the challenge 38 is assigned to the user 40 and the challenge repository 36 is updated with the authentic response 39 of the user.

Figure 3:
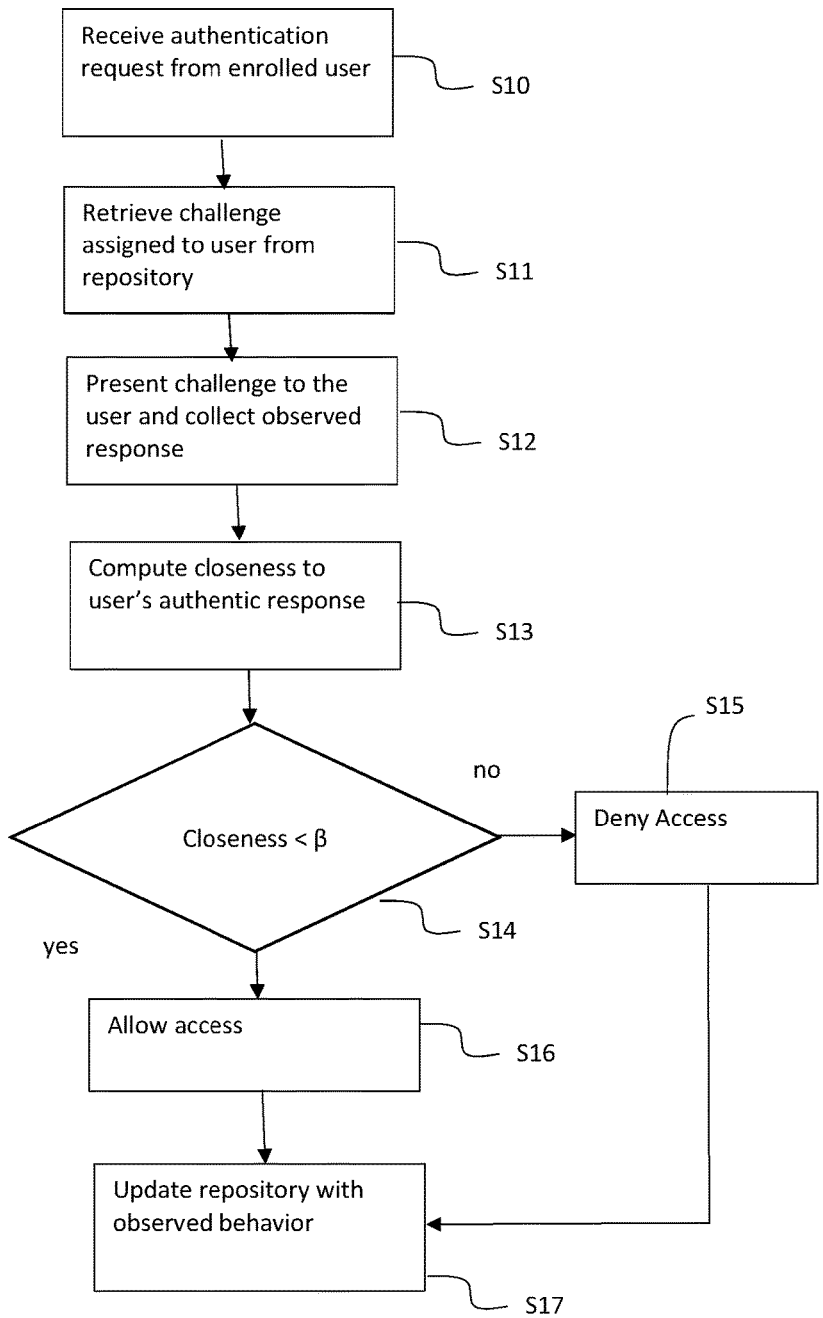
FIG. 3 shows a flow diagram of an authentication process according to embodiments.

FIG. 3 depicts a flow diagram showing an authentication process with reference to FIG. 1. At S10, an authentication request is received from a user 40, and at S11, the challenge 38 assigned to the user 40 is retrieved from the challenge repository 36. At S12, the challenge 38 is presented to the user 40 and an observed response 50 is collected. At S13, a closeness of the observed response 50 to the user's authentic response is calculated by closeness calculator 32, and at S14 a determination is made whether the closeness is less than β. If no at S14, access is denied at S15 and the challenge repository 36 may be updated with the observed response 50. If yes at S14, access is allowed at S16 and the challenge repository 36 is updated at S17 with the observed response 50, e.g., to further refine the authentic response 39.

It is understood that CBSC system 18 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 10 that may comprise any type of computing device and for example includes at least one processor 12, memory 17, an input/output (I/O) 14 (e.g., one or more I/O interfaces and/or devices), and a communications pathway 16. In general, processor(s) 12 execute program code which is at least partially fixed in memory 17. While executing program code, processor(s) 12 can process data, which can result in reading and/or writing transformed data from/to memory and/or I/O 14 for further processing. The pathway 16 provides a communications link between each of the components in computing system 10. I/O 14 can comprise one or more human I/O devices, which enable a user to interact with computing system 10. Computing system 10 may also be implemented in a distributed manner such that different components reside in different physical locations.

Furthermore, it is understood that the CBSC system 18 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A cognitive behavior security control (CBSC) system, comprising:
a repository having a plurality of challenges, each challenge including an interactive graphical task;
a user interface for graphically presenting challenges to a user;
an enrollment system for assigning challenges to the user and determining an authentic response for the user, wherein each of the plurality of challenges require the user to utilize a plurality of keystrokes to move a graphical object, wherein an observed response is the plurality of keystrokes by the user;
an authentication system that collects the observed response from the user presented with an assigned challenge and determines a security control result based on a closeness of the observed response with the authentic response of the user; and
a feedback analyzer that refines the authentic response of the user based on collected observed responses of the user, wherein:
the closeness of the observed response with the authentic response is compared with a threshold value $\beta$ that is computed as a function of required false positive and false negative probabilities, and
the threshold value $\beta$ is refined over time using machine learning.

2. The CBSC system of claim 1, wherein the observed response and the authentic response are each modeled as behavior vectors that include a set of response attributes.

3. The CBSC system of claim 2, further comprising a proximity calculator that determines whether a selected challenge is appropriate for the user during an enrollment process, wherein the proximity calculator determines whether a collected behavior vector is less than a predetermined distance to a statistical norm of a set of users presented with the selected challenge.

4. The CBSC system of claim 1, wherein each of the plurality of challenges is a game with an objective.

5. A non-transitory computer program product stored on a computer readable storage medium, which when executed by a computing system, provides cognitive behavior security control, the non-transitory computer program product comprising:
program code for storing a plurality of challenges, wherein each challenge includes an interactive graphical task;
program code for graphically presenting challenges to a particular user;
program code for implementing an enrollment process that assigns challenges to the particular user and determines an authentic response for the particular user, wherein each of the plurality of challenges requires the particular user to utilize a plurality of keystrokes to move a graphical object, wherein an observed response is the plurality of keystrokes by the particular user;

program code that collects the observed response from the particular user presented with an assigned challenge and determines a security control result based on a closeness of the observed response with the authentic response for the particular user, wherein the closeness of the observed response with the authentic response is compared with a threshold value β that is computed as a function of required false positive and false negative probabilities; and program code that refines the authentic response of the particular user based on collected observed responses of the particular user.

6. The program product of claim 5, wherein the observed response and the authentic response are each modeled as behavior vectors that include a set of response attributes.

7. The program product of claim 6, further comprising a proximity calculator that determines whether a selected challenge is appropriate for the particular user during the enrollment process, wherein the proximity calculator determines whether a collected behavior vector is less than a predetermined distance to a statistical norm of a set of users presented with the selected challenge.

8. The program product of claim 5, wherein the threshold value β is refined over time using machine learning.

9. The program product of claim 5, wherein each of the plurality of challenges is a game with an objective.

10. A computerized method of providing cognitive behavior security control, the method comprising:

storing a plurality of challenges, wherein each challenge includes an interactive graphical task;

providing an interface for graphically presenting the plurality of challenges to a user, wherein each of the plurality of challenges require the user to utilize a plurality of keystrokes to move a graphical object, wherein an observed response is the plurality of keystrokes by the user;

enrolling the user, including assigning a challenge to the user and determining an authentic response of the user;

presenting an assigned challenge to the user;

collecting the observed response from the user; and determining a security control result based on a closeness of the observed response with the authentic response for the user, wherein the closeness of the observed response with the authentic response is compared with a threshold value β that is computed as a function of required false positive and false negative probabilities.

11. The method of claim 10, wherein the observed response and the authentic response are each modeled as behavior vectors that include a set of response attributes.

12. The method of claim 11, further comprising determining whether a selected challenge is appropriate for the user during enrolling by calculating whether a collected behavior vector is less than a predetermined distance to a statistical norm of a set of users presented with the selected challenge.

13. The method of claim 10, further comprising refining the authentic response of the user based on collected observed responses of the user.

14. The method of claim 10, wherein each of the plurality of challenges is a game with an objective.

\* \* \* \* \*